Aug. 14, 1945.　　　　W. J. BLOOMER　　　　2,381,996
AZEOTROPIC DISTILLATION
Filed May 30, 1942
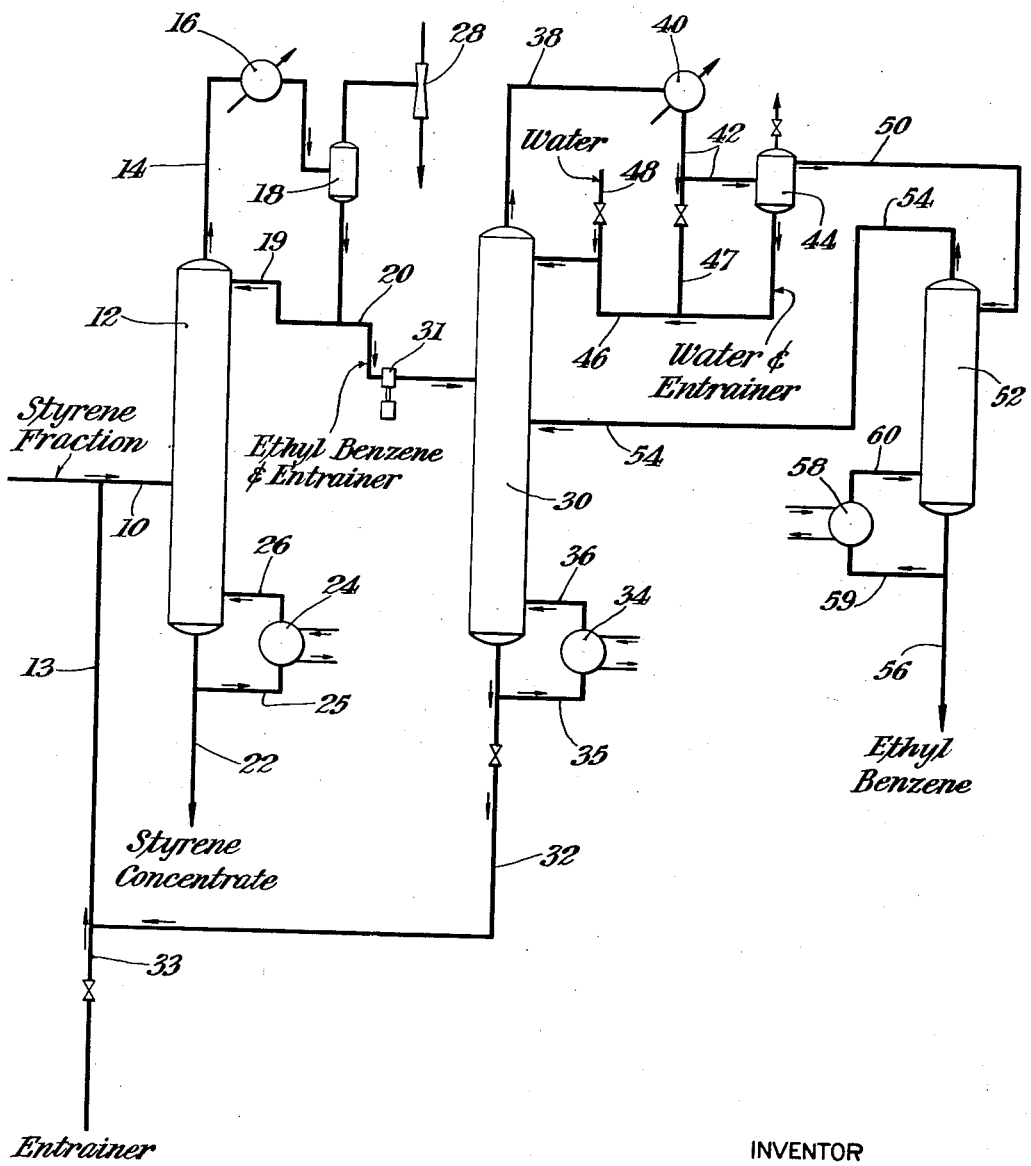
INVENTOR
*Ward J. Bloomer*
BY
*Nathaniel Ely*
ATTORNEY Patented Aug. 14, 1945

2,381,996

UNITED STATES PATENT OFFICE 2,381,996

AZEOTROPIC DISTILLATION

Ward J. Bloomer, Westfield, N. J., assignor to The Lummus Company, New York, N. Y., a corporation of Delaware Application May 30, 1942, Serial No. 445,127

9 Claims. (Cl. 202—42)

This invention relates to azeotropic distillation and particularly to the recovery of the azeotrope-forming agent or entrainer used in such distillation. This application is a continuation-in-part of my prior copending application, S. N. 430,147, filed February 9, 1942.

In my application referred to above, I have disclosed a procedure for recovering concentrated styrene by means of azeotropic distillation in the presence of particular entrainers whereby the hydrocarbons having boiling points close to that of styrene are separated as an overhead in the form of substantially a binary azeotrope with the entrainer. Such an entrainer is preferably soluble in the hydrocarbons which have been separated from the crude styrene fraction, and for economic reasons it is desirable to recover the entrainer from such solution for reuse. Washing or leaching of the entrainer from the hydrocarbon solution with a solvent that dissolves substantially only the entrainer has been proposed, and water is admirably suited for this purpose because of its abundance and cheapness. The use of water for such purpose has heretofore been considered disadvantageous, however, since, in the separation of the water from most of the entrainers, an azeotrope of the water with the entrainer is formed and a complex system for recovering the entrainer is then necessary.

It is the primary object of my invention to provide an improved procedure for separating the components of a binary azeotropic solution.

It is a further object of my invention to provide an improved method for recovering the azeotrope-forming agent or entrainer used in the separation of a particular component from admixture with other close-boiling components by azeotropic distillation.

It is another object of my invention to provide an improved procedure for utilizing water in the recovery of the entrainer used to separate styrene, toluene, or the like from admixture with like-boiling hydrocarbons by azeotropic distillation.

Further objects and advantages of my invention will be apparent from the following description thereof taken in connection with the attached drawing illustrative thereof.

In one embodiment of my invention, the mixture of like-boiling constituents containing the component to be separated therefrom in a more concentrated form may be conveniently introduced through line 10 into distillation tower 12. Such a mixture may comprise a fraction of primarily close-boiling aromatic hydrocarbons containing styrene in a relatively low concentration. This crude styrene mixture may comprise, for example, the product obtained by the dehydrogenation of ethyl benzene to styrene, or it may comprise a styrene-containing fraction obtained from the drip oil recovered in the manufacture of artificial gas or from the coal tar distillate produced in the coking of coal.

It will be appreciated that the composition of the dilute styrene fraction to be concentrated will depend on its source and on the prior treatment to which it has been subjected. A typical example of the product formed in the dehydrogenation of ethyl benzene to styrene may have the following composition:

| | Weight percentage | B. P. |
|---|---|---|
| | | °F. |
| Benzene | 7.3 | 176.2 |
| Toluene | 5.5 | 231.1 |
| Ethyl benzene | 62.2 | 277.2 |
| Styrene | 20.3 | 294.8 |
| Higher boiling components | 4.8 | |

The composition of a typical styrene-containing fraction obtained from the light oil distillate produced in the coking of coal may be as follows:

| | Weight Percentage | B. P. |
|---|---|---|
| | | °F. |
| Ethyl benzene | 2 | 277.2 |
| Paraxylene | 13 | 281.1 |
| Metaxylene | 35 | 282.7 |
| Orthoxylene | 5 | 288.9 |
| Styrene | 27 | 294.8 |
| Propyl benzenes | 10 | 307-316 |
| Trimethyl benzenes | 2 | 328 |
| Olefins | 5 | 356-401 |
| Paraffins | 2 | 356-401 |
| Higher boiling components | 1 | |

Since the styrene in such a fraction is admixed with other hydrocarbon materials of like boiling point, for this reason it is substantially impossible to recover the styrene in a highly concentrated condition by ordinary distillation methods. For example, the concentrated fraction obtained by subjecting a crude styrene fraction to ordinary distillation even under a relatively high vacuum contains approximately only 55% styrene by volume. Accordingly, azeotropic distillation is desirably resorted to for the separation of styrene from such a mixture as disclosed in my prior copending application, S. N. 430,147.

Among the materials which I have found suitable for such purpose are the lower fatty acids, particularly acetic acid, the lower normally liquid aliphatic alcohols such as ethyl alcohol and butyl alcohol, the ethylene glycol ethers, particularly "Methyl Cellosolve" (ethylene glycol monomethyl ether), and other polar oxygen-containing organic compounds. I have had particular success in the use of "Methyl Cellosolve" and of acetic acid for this purpose.

For convenience only, my invention will be described in connection with the azeotropic distillation of a crude styrene fraction in the presence of "Methyl Cellosolve" as the entrainer to obtain a highly concentrated styrene product wherein the crude styrene fraction has been obtained by the dehydrogenation of ethyl benzene. The boiling point of "Methyl Cellosolve" is 255.7° F.

The necessary amount of "Methyl Cellosolve" to effect the desired azeotropic separation is added through line 13 to the incoming crude styrene fraction. In tower 12 this crude styrene fraction is distilled in the presence of the "Methyl Cellosolve," which forms an azeotropic mixture with a major portion of the like-boiling hydrocarbons associated with the styrene. This azeotropic mixture is removed overhead through line 14 for condensation in condenser 16, the condensate from which is collected in accumulator 18. A portion of the resulting condensate is returned as reflux to tower 12 through line 19, and the remainder of this condensate is passed through line 20 for recovery of the "Methyl Cellosolve" as will be hereinafter more particularly described. The styrene concentrate is removed from tower 12 through bottoms line 22 and may be used as such or may be separated from the remaining primarily higher boiling hydrocarbons in any appropriate manner.

Heat is supplied to tower 12 by means of a reboiler 24, through which a portion of the bottoms from the tower is circulated as by means of lines 25 and 26. Tower 12 is desirably operated under a vacuum, for example, on the order of 100 mm. Hg absolute pressure, in order to prevent undue polymerization of the styrene because of heating and other side reactions; and the necessary vacuum may conveniently be produced by a jet ejector 28 or the like in communication with accumulator 18. The operating conditions are also desirably so maintained that substantially no styrene or, at the most, only a minimum amount of styrene appears in the overhead vapors from column 12.

In accordance with my invention, the azeotropic overhead condensate from tower 12 is introduced through line 20 into column 30 as by means of pump 31. In the treatment of the particular styrene fraction mentioned, this overhead condensate comprises an azeotropic mixture of "Methyl Cellosolve" and hydrocarbons consisting for the most part of ethyl benzene. This azeotropic mixture is subjected to distillation in column 30 in the presence of a liquid which is soluble in the "Methyl Cellosolve" but insoluble in the ethyl benzene or other hydrocarbons and in which the "Methyl Cellosolve" is preferentially more soluble than in the ethyl benzene. A suitable liquid for this purpose comprises water, which will dissolve the "Methyl Cellosolve" but not the ethyl benzene. Furthermore, "Methyl Cellosolve" is preferentially considerably more soluble in the water than in the hydrocarbons. The effect of this azeotropic distillation is to break up the binary azeotrope of "Methyl Cellosolve" and ethyl benzene so that the "Methyl Cellosolve" can be readily recovered for reuse as the entrainer in the azeotropic concentration of the crude styrene fraction and so that the separated ethyl benzene can be eliminated from the system without resort to a complex recovery system.

The operation in column 30 is desirably conducted under such conditions that "Methyl Cellosolve" substantially free of ethyl benzene and water is produced as a bottoms product. The operating conditions may be so regulated, however, that a relatively small percentage of ethyl benzene is retained in the "Methyl Cellosolve" bottoms stream if it is so desired for reasons of heat economy or the like. This substantially absolute "Methyl Cellosolve" is removed through bottoms line 32 and is recirculated through line 13 for admixture with the incoming crude styrene fraction. Provision may be made for the introduction through line 33 of additional "Methyl Cellosolve" to make up for any losses occurring in the system. Heat may be supplied to column 30 as by means of reboiler 34, for which purpose a portion of the bottoms stream from this column is circulated through the reboiler as by means of lines 35 and 36. According to my invention, column 30 is operated at a pressure higher than that maintained in tower 12; and this pressure may conveniently be substantially atmospheric.

Upon distillation of the binary azeotropic mixture of "Methyl Cellosolve" and ethyl benzene in the presence of water in column 30, a ternary azeotrope of "Methyl Cellosolve," ethyl benzene, and water is formed. The operating conditions are desirably so maintained that substantially all of the ethyl benzene and other hydrocarbons are contained in this overhead. This ternary azeotrope is removed from column 30 through overhead line 38 to condenser 40, wherein it is subjected to a substantially complete condensation. The resulting condensate is passed through line 42 into separator 44, wherein it separates into an upper ethyl benzene layer and a lower water layer. The "Methyl Cellosolve," being soluble in both materials, is distributed between the two layers according to its preferential solubility. Since the "Methyl Cellosolve" is preferentially more soluble in water, the water layer is returned through line 46 to column 30 as reflux. A portion of the initial ternary azeotrope condensate flowing through line 42 may be passed directly to column 30 through valved by-pass line 47 as supplementary reflux, or a portion of the upper hydrocarbon layer in separator 44 may be used for this purpose. Line 48 is desirably provided for the introduction of make-up water to take care of any losses of water in the system. Sufficient water is introduced into the system at the start of operations and the amount of water maintained in the system is adjusted in accordance with the composition of the feed to column 30 so that the removal of substantially all the ethyl benzene in the ternary azeotrope overhead therefrom is assured.

By means of this procedure, I am enabled to utilize water in the recovery of the entrainer employed in the azeotropic distillation of styrene without the formation of an undesirable azeotrope of the water and such entrainer. The water serves to break up the binary azeotrope formed in the styrene azeotropic distillation and to form a ternary azeotrope with the separated hydrocarbons and a portion of the entrainer. In this manner, I obtain an effective and efficient separation of the ethyl benzene from the "Methyl Cellosolve" which is recovered and is returned to the styrene azeotropic distillation column in a substantially absolute condition. Furthermore, because of the separation of the ternary azeotrope condensate into two layers, I am enabled to return the water layer containing the major portion of the "Methyl Cellosolve" in such azeotrope to the ternary azeotropic distillation column as reflux. The water is thus continuously circulated in a closed cycle which includes the top of column 30 and its accompanying condenser 40 and separator 44; and it is necessary only to introduce the requisite amount of water into the system at the start of operations. My improved method of operating not only eliminates the disadvantages of using water to recover the entrainer by washing but also utilizes the water to simplify the steps of recovering the entrainer.

The upper hydrocarbon layer in separator 44 may be desirably further treated to recover the small amount of "Methyl Cellosolve" which may remain dissolved therein. This hydrocarbon layer is passed through line 50 and is introduced into column 52, wherein a separation is effected between ethyl benzene and the azeotrope of "Methyl Cellosolve" with ethyl benzene. This binary azeotrope is removed overhead through line 54 and is preferably introduced into column 30 at a point in accordance with its composition. Any water that may be present in this hydrocarbon layer will appear in the overhead vapors. A separate condensation system for column 52 may be provided if desired. Ethyl benzene substantially free of "Methyl Cellosolve" is removed through bottoms line 56. Reboiler 58, through which a portion of the ethyl benzene bottoms in column 52 is circulated as by means of lines 59 and 60, is provided to supply heat to column 52. This column is also operated under a higher pressure than that maintained in tower 12 and may be conveniently maintained at substantially the same pressure as that maintained on column 30, which pressure in this case is atmospheric.

The following application of my invention will illustrate its operation. A crude styrene fraction obtained by the dehydrogenation of ethyl benzene is admixed with "Methyl Cellosolve" and is subjected to azeotropic distillation in column 12 in accordance with the disclosure of my copending application, S. N. 430,147, to produce a styrene concentrate which is removed through bottoms line 22. An absolute pressure of 62 mm. Hg is maintained at the top of tower 12, and a binary azeotropic overhead condensate containing 61.0% ethyl benzene and 39.0% "Methyl Cellosolve" by volume is obtained. The temperature of the overhead binary vapors at this pressure is approximately 124° F. This condensate is passed to the ternary azeotropic distillation column 30, wherein it is distilled under substantially atmospheric pressure in the presence of water for the recovery of "Methyl Cellosolve." A bottoms stream comprising substantially absolute "Methyl Cellosolve" is produced and is recycled to tower 12 for reuse therein. The ternary azeotropic overhead from column 30 contains 67.2% ethyl benzene, 7.4% "Methyl Cellosolve", and 25.4% water by volume. At atmospheric pressure the temperature of these overhead ternary vapors is about 195° F. Upon condensation of this overhead, two layers are formed. The lower layer representing 31.7% by volume of the ternary azeotropic mixture consists of 19.9% "Methyl Cellosolve" and 80.1% water by volume. The upper layer representing 68.3% by volume of the ternary azeotropic mixture contains approximately 98.5% ethyl benzene and 1.5% "Methyl Cellosolve" by volume. Although the upper layer may contain a little water and the lower layer a little ethyl benzene, it will be apparent that the amount thereof is small since the upper layer is composed substantially of ethyl benzene, in which water is insoluble, and the lower layer is composed primarily of water, in which the ethyl benzene is insoluble. This upper layer is passed to column 52, wherein the small amount of "Methyl Cellosolve" in such layer is separated under atmospheric pressure from the ethyl benzene, which is removed through bottoms line 56 in a substantially pure condition. A binary azeotrope of ethyl benzene and "Methyl Cellosolve" is formed and is passed to column 30 for ultimate recovery of the "Methyl Cellosolve." This binary azeotrope contains 48.8% ethyl benzene and 51.2% "Methyl Cellosolve" by volume. The temperature of these binary vapors at atmospheric pressure is approximately 242° F. Because of the small amount of "Methyl Cellosolve" to be removed, it may also be desirable to take off additional ethyl benzene in the overhead. In such case the temperature of the overhead vapors is greater than that for the binary vapors.

In the application of my invention to the separation of the styrene-containing fraction derived from the light oil distillate obtained in the coking of coal, the separation in column 12 is primarily between the xylenes and styrene. With "Methyl Cellosolve" as the entrainer, the overhead vapors from column 12 comprise substantially a binary azeotrope of xylenes and "Methyl Cellosolve." Other primarily aromatic hydrocarbons such as ethyl benzene and the propyl benzenes are admixed with the xylenes; but the xylenes comprise the greater portion of the hydrocarbons in this binary azeotrope. The overhead condensate from column 12 is then fractionated in the presence of water in column 30, from the bottom of which substantially absolute "Methyl Cellosolve" is removed for recycling to column 12. The overhead vapors from column 30 comprise a ternary azeotrope of the xylenes, "Methyl Cellosolve" and water, which upon condensation separates into a xylene layer and a water layer with the "Methyl Cellosolve" distributed between the two layers according to its preferential solubility. The water layer, which contains the greater portion of the "Methyl Cellosolve," is returned to column 30 as reflux. The xylene layer is desirably further fractionated to separate substantially pure xylenes from a binary azeotrope overhead of the xylenes and "Methyl Cellosolve," which is preferably returned to column 30 for further treatment.

The recovery of entrainers used in the azeotropic concentration of other polymerizable vinyl aromatic compounds is also within the scope of my invention. Such compounds include methyl styrene, chlorinated derivatives of styrene, and the like.

My invention is also applicable to the azeotropic concentration of toluene from its admixture with close-boiling primarily paraffinic hydrocarbons. Heretobefore only such entrainers as methyl alcohol and the like have been employed in this azeotropic separation because of the complex system required for the recovery of those entrainers which form an azeotrope with the medium such as water used to wash the entrainer from its solution with the hydrocarbons separated from the toluene. By means of my invention, these entrainers which form a binary azeotrope with water may be used without incurring the disadvantages of prior practice. It is to be noted that the use of many of these entrainers is very desirable in that a greater hydrocarbon to entrainer ratio in the azeotrope is obtained. In this connection attention is directed to my prior copending application, S. N. 436,847, filed March 30, 1942, which discloses an improved method of utilizing water in the azeotropic concentration of toluene.

When such a toluene-containing fraction is being concentrated in accordance with my invention by means of azeotropic distillation in the presence of a suitable entrainer such as acetic acid, "Methyl Cellosolve" or the like, the binary azeotrope removed overhead from column 12 contains primarily paraffinic hydrocarbons and the entrainer. This binary azeotrope is then fractionated in the presence of water in column 30, from the bottom of which the entrainer is removed in substantially absolute condition for recirculation to column 12. The overhead from column 30 comprises a ternary azeotrope of paraffinic hydrocarbons, entrainer, and water. Upon condensation this azeotrope separates into a hydrocarbon layer and a water layer, in both of which the entrainer is dissolved according to its preferential solubility. The water layer is returned to column 30 as reflux, and the hydrocarbon layer is further fractionated in column 52 to leave the paraffinic hydrocarbons in substantially pure condition.

The application of my invention is not limited to the particular examples described herein. It is applicable to the recovery of the entrainer used in the azeotropic concentration of a particular component from any mixture of close-boiling components in which such entrainer is soluble. In the recovery of this entrainer by means of the ternary azeotropic distillation, the second entrainer (water) used for this purpose should be insoluble or substantially insoluble in the components of the initial mixture undergoing separation so that the desired layer formation upon the condensation of the ternary azeotrope is assured. In addition, the second entrainer should be soluble or substantially soluble in the first entrainer; and the first entrainer should be preferentially more soluble in the second entrainer than in the components of the initial mixture.

It will also be apparent that my invention is applicable to the breaking up of a binary azeotrope whose components have the above characteristics.

My invention is also not limited to the use of a vacuum in column 12 and the use of atmospheric pressure in columns 30 and 52. Any suitable pressure may be used in column 12, and any suitable pressure may be used in columns 30 and 52; and in some cases the same pressure may be maintained in all the columns.

Although I have described a preferred procedure for carrying out my invention, it will be apparent that modifications may be made thereto. Accordingly, only such limitations as appear in the claims appended hereinafter should be applied.

I claim:

1. The method of separating a mixture of ethyl benzene and ethylene glycol monomethyl ether, said components forming a minimum boiling binary azeotrope and also forming a minimum boiling ternary azeotrope with water, which comprises subjecting such mixture to a ternary azeotropic distillation in the presence of water, removing the overhead vapors from such distillation comprising substantially a ternary azeotrope of the water, substantially all of the ethyl benzene, and a portion of the ethylene glycol monomethyl ether, and removing ethylene glycol monomethyl ether substantially free of ethyl benzene as the bottoms stream from such distillation 2. The method of separating a mixture of ethyl benzene and acetic acid, said components forming a minimum boiling binary azeotrope and also forming a minimum boiling ternary azeotrope with water, which comprises subjecting such mixture to a ternary azeotropic distillation in the presence of water, removing the overhead vapors from such distillation comprising substantially a ternary azeotrope of the water, substantially all of the ethyl benzene, and a portion of the acetic acid, and removing acetic acid substantially free of ethyl benzene as the bottoms stream from such distillation.

3. The method of separating a mixture of xylenes and ethylene glycol monomethyl ether, said components forming a minimum boiling binary azeotrope and also forming a minimum boiling ternary azeotrope with water, which comprises subjecting such mixture to a ternary azeotropic distillation in the presence of water, removing the overhead vapors from such distillation comprising substantially a ternary azeotrope of the water, substantially all of the xylenes, and a portion of the ethylene glycol monomethyl ether, and removing ethylene glycol monomethyl ether substantially free of xylenes as the bottoms stream from such distillation.

4. The method of separating a mixture of xylenes and acetic acid, said components forming a minimum boiling binary azeotrope and also forming a minimum boiling ternary azeotrope with water, which comprises subjecting such mixture to a ternary azeotropic distillation in the presence of water, removing the overhead vapors from such distillation comprising substantially a ternary azeotrope of the water, substantially all of the xylenes, and a portion of the acetic acid, and removing acetic acid substantially free of xylenes as the bottoms stream from such distillation.

5. The method of separating styrene from a mixture thereof with close-boiling aromatic hydrocarbons selected from the group consisting of ethyl benzene and the xylenes, which comprises subjecting such mixture to a binary azeotropic distillation in the presence of an entrainer that is soluble in the hydrocarbon mixture and that forms a binary azeotrope with the aromatic hydrocarbons, removing a styrene concentrate as the bottoms stream from such binary distillation, removing a binary azeotrope comprising the aromatic hydrocarbons and the entrainer as the overhead therefrom, subjecting this binary azeotrope to a ternary azeotropic distillation in the presence of water, the entrainer having a greater preferential solubility in the water than in the aromatic hydrocarbons and forming a ternary azeotrope with the aromatic hydrocarbons and the water, removing the entrainer substantially free of aromatic hydrocarbons as the bottoms stream from the ternary distillation, recycling this separated entrainer to the binary distillation for reuse therein, condensing the overhead vapors from the ternary distillation comprising substantially a ternary azeotrope of the entrainer, the aromatic hydrocarbons, and the water whereby the resulting condensate separates into an aromatic hydrocarbon layer and a water layer, the entrainer being distributed between the layers according to its preferential solubility, refluxing the ternary distillation with the water layer, and separating the aromatic hydrocarbons from the other layer.

6. The process as claimed in claim 5, which includes conducting the binary azeotropic distillation at a subatmospheric pressure and conducting the ternary azeotropic distillation at a higher pressure.

7. The method as claimed in claim 5, which includes subjecting the aromatic hydrocarbon layer to a separate azeotropic distillation, removing the aromatic hydrocarbons as a bottoms stream from this latter distillation, removing an azeotrope including the aromatic hydrocarbons and the entrainer as the overhead from this latter distillation, and returning this overhead to the ternary distillation at a point in accordance with its composition.

8. The method as claimed in claim 5, in which the entrainer comprises ethylene glycol monomethyl ether.

9. The method as claimed in claim 5, in which the entrainer comprises acetic acid.

WARD J. BLOOMER.